US010250949B2

(12) United States Patent
Luthra et al.

(10) Patent No.: US 10,250,949 B2
(45) Date of Patent: *Apr. 2, 2019

(54) BROADCAST CONTENT TO HTTP CLIENT CONVERSION

(71) Applicant: Google Technology Holdings LLC, Mountain View, CA (US)

(72) Inventors: Ajay K. Luthra, San Diego, CA (US); Praveen N. Moorthy, San Diego, CA (US); Mark S. Schmidt, San Diego, CA (US); Haifeng Xu, San Diego, CA (US); Thomas L. du Breuil, Ivyland, PA (US); Glen Peter Goffin, II, Dublin, PA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,720

(22) Filed: Jun. 15, 2015

(65) Prior Publication Data

US 2015/0281800 A1    Oct. 1, 2015

Related U.S. Application Data

(63) Continuation of application No. 13/600,480, filed on Aug. 31, 2012, now Pat. No. 9,071,853.

(51) Int. Cl.
*H04N 21/266* (2011.01)
*H04N 21/647* (2011.01)
(Continued)

(52) U.S. Cl.
CPC ........... *H04N 21/64784* (2013.01); *H04N 21/234309* (2013.01); *H04N 21/4363* (2013.01);
(Continued)

(58) Field of Classification Search
None
See application file for complete search history.

(56) References Cited

U.S. PATENT DOCUMENTS

| 7,668,914 B2 | 2/2010 | Parker et al. | |
|---|---|---|---|
| 2005/0216950 A1* | 9/2005 | MacInnis | H04N 5/4401 725/135 |

(Continued)

FOREIGN PATENT DOCUMENTS

| CN | 102404646 A | 4/2012 |
|---|---|---|
| WO | 2011090715 A2 | 7/2011 |

OTHER PUBLICATIONS

Patent Cooperation Treaty, International Search Report and Written Opinion of the International Searching Authority for International Application No. PCT/US2012/05446, dated Nov. 21, 2013, 8 pages.

*Primary Examiner* — Pankaj Kumar
*Assistant Examiner* — Charles N Hicks
(74) *Attorney, Agent, or Firm* — Lowenstein Sandler LLP

(57) ABSTRACT

In embodiments of broadcast content to HTTP client conversion, a client converter receives video content as an input of broadcast content data streams from a content distribution system. The client converter can join a content data stream of the broadcast input, and convert the content data stream to unicast HTTP data, such as video content segments that are buffered for communication to a client device or to a media player of a client device. An HTTP server of the client converter can then communicate the unicast HTTP data to the client device or to the media player for playback of the video content.

20 Claims, 7 Drawing Sheets

(51) Int. Cl.
    *H04N 21/2343*    (2011.01)
    *H04N 21/4363*    (2011.01)
    *H04N 21/61*      (2011.01)
    *H04N 21/6408*    (2011.01)

(52) U.S. Cl.
    CPC ..... *H04N 21/6125* (2013.01); *H04N 21/6408* (2013.01); *H04N 21/64707* (2013.01)

(56) References Cited

U.S. PATENT DOCUMENTS

| | | | | |
|---|---|---|---|---|
| 2009/0010273 | A1* | 1/2009 | Green | H04L 29/06027 370/432 |
| 2011/0202965 | A1* | 8/2011 | Henry | H04N 7/17318 725/110 |
| 2011/0239262 | A1* | 9/2011 | Yang | H04N 21/26616 725/109 |
| 2012/0096504 | A1 | 4/2012 | Waller et al. | |
| 2012/0174163 | A1 | 7/2012 | Moorthy et al. | |
| 2012/0240174 | A1* | 9/2012 | Rhyu | H04N 21/643 725/109 |
| 2012/0303760 | A1* | 11/2012 | Begen | H04L 65/4076 709/219 |

* cited by examiner

BROADCAST CONTENT TO HTTP CLIENT CONVERSION

CROSS-REFERENCE TO RELATED APPLICATIONS

This patent application is a continuation of U.S. Non-Provisional application Ser. No. 13/600,480, filed Aug. 31, 2012, entitled "BROADCAST CONTENT TO HTTP CLIENT CONVERSION," which is incorporated herein by reference for all purposes.

TECHNICAL FIELD

This disclosure relates generally to the field of broadcast content to HTTP client conversion, and more specifically, to converting video content that is received in a non-unicast format to unicast HTTP data for playback of the video content at a client device.

BACKGROUND

The traditional notion of watching television at home has evolved into many different forms of viewing television content, on many different devices. For example, users can watch television content, such as live television, recorded television, and time-shifted programs and movies, on various devices. Television viewing devices include televisions, display devices, entertainment devices, computers, and even mobile devices, such as tablets and mobile phones. Streaming video content over HTTP to a client device is a common technique that utilizes a one-to-one connection between a content server and a client device. However, even if two different client devices are receiving the same video content (e.g., a television program or movie), two separate bit streams are distributed from the content server, which may over-utilize network bandwidth.

The content server may also generate multiple streams of the same video content, each having a different bitrate, for a broadcast of the video content to each of the client devices. A client device can then adaptively select the video content stream with a bitrate that is most suitable for download based on network capacity. For example, a client device connects to a server over a network and downloads segments (also referred to as "chunks") of the video content that are listed in a manifest file. Based on network throughput, the client device can download the content segments having a bitrate that accommodates the current network throughput.

BRIEF DESCRIPTION OF THE DRAWINGS

Embodiments of broadcast content to HTTP client conversion are described with reference to the following Figures. The same numbers may be used throughout to reference like features and components that are shown in the Figures.

DETAILED DESCRIPTION

Embodiments of broadcast content to HTTP client conversion can be implemented to convert video content that is received in a broadcast, non-unicast format to unicast HTTP data for playback of the video content at a client device. A client converter can be implemented as an independent device, or as an integrated component and/or software application of a client device, router, or content distribution edge server. Additionally, the client converter can be implemented as an interface for HTTP Live Streaming (HLS) client devices that receive HLS compliant bit streams, as well as other streaming client devices, such as Dynamic Adaptive Streaming over HTTP (DASH) clients. The client converter can also be implemented as an interface for any media player that supports HTTP, but is not implemented to support playback of broadcast content.

While features and concepts of broadcast content to HTTP client conversion can be implemented in any number of different devices, systems, networks, and/or configurations, embodiments of broadcast content to HTTP client conversion are described in the context of the following example devices, systems, and methods.

Figure 1:
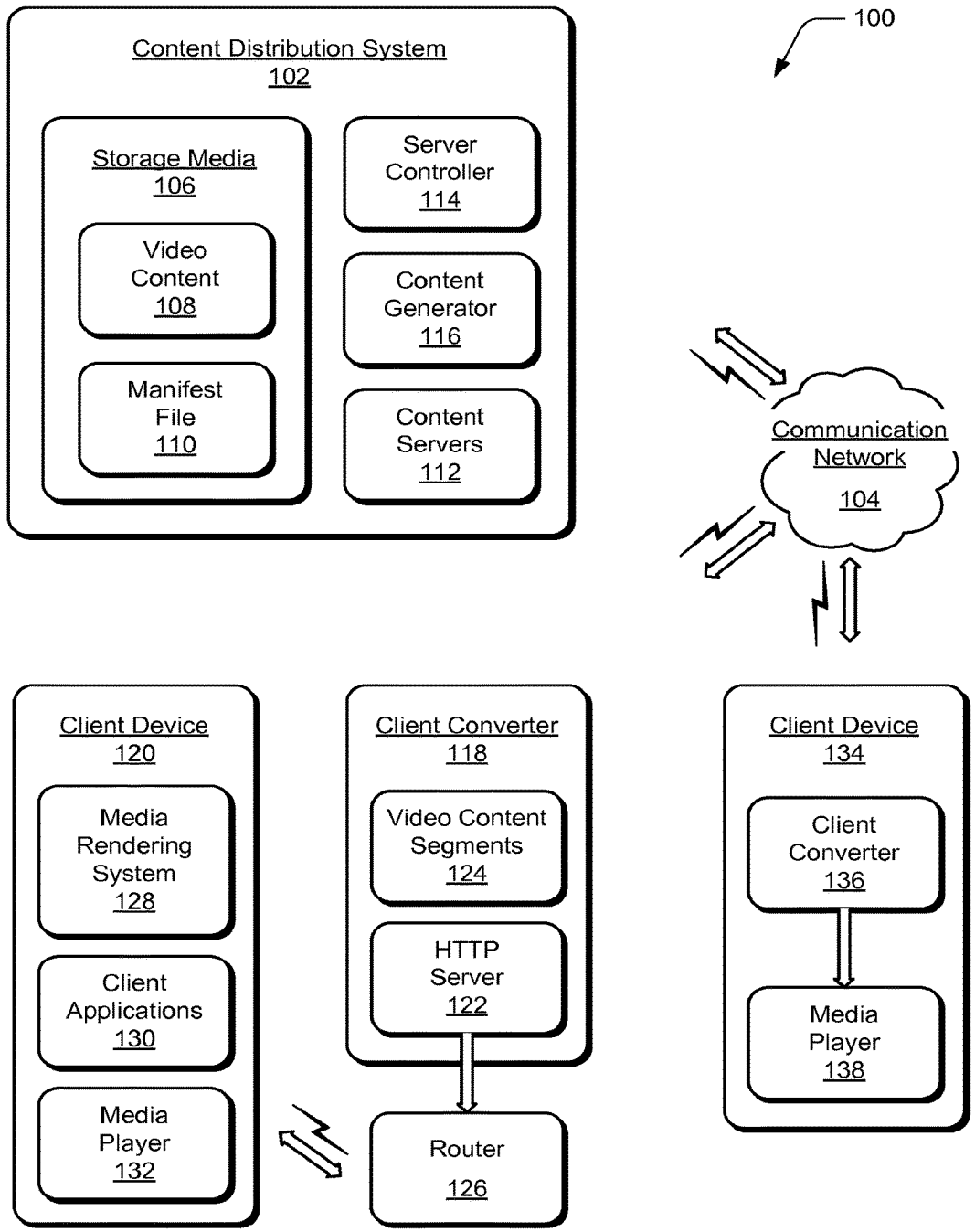
FIG. 1 illustrates an example system in which embodiments of broadcast content to HTTP client conversion can be implemented.

FIG. 1 illustrates an example system 100 in which embodiments of broadcast content to HTTP client conversion can be implemented. The example system 100 includes a content distribution system 102 that is implemented to deliver video content and data to any number of various devices via a communication network 104. The content distribution system 102 includes storage media 106 that may be any type of memory and/or suitable electronic data storage to store or otherwise maintain video content 108 and other data. The video content 108 can include any type of audio, video, and/or image data in the form of television programming, movies, on-demand video, interactive games, advertisements, and the like. The storage media maintains the video content for distribution to client devices, and includes a manifest file 110 that identifies multiple video content streams each at a different bitrate.

The content distribution system 102 also includes content servers 112 to distribute the video content streams to the client devices. For example, the video content for a program (e.g., a television program or movie) is broadcast in multi-bitrate versions via the communication network 104, along with lists of programs that are published to client devices. The published lists can include program metadata that is associated with the programs (e.g., a program name, genre, summary, etc.), as well as addresses for discovery of the respective programs.

The content distribution system 102 can also include a server controller 114 and a content generator 116 (e.g., an encoder, transcoder, data packager, etc.), both of which can be implemented as computer-executable instructions, such as software applications that are executable by one or more processors to implement content distribution. The server controller manages the distribution of the video content 108 and other data to the client devices, and publishes the manifest file 110 to the client devices. The content generator 116 generates segments of the video content to generate the multiple video content streams each at a different bitrate for distribution of the video content to the various client devices. The multiple video content streams can be generated by encoding, transcoding, packaging, and/or any other type of modifying the video content.

Any of the systems, servers, and devices can communicate via the communication network 104, which can be implemented to include a wired and/or a wireless network. The communication network can also be implemented using any type of network topology and/or communication protocol, and can be represented or otherwise implemented as a combination of two or more networks, to include IP-based networks and/or the Internet. The communication network may also include mobile operator networks that are managed by a mobile network operator and/or other network operators, such as a communication service provider, cell-phone provider, and/or Internet service provider.

The system 100 also includes an example of a client converter 118 that can receive video content in a broadcast, non-unicast format from the content distribution system 102. The client converter can join a broadcast content data stream and is implemented to convert the content data stream to unicast HTTP data. The client converter can then communicate the video content as the unicast HTTP data to one or more client devices 120 from an HTTP server 122. The client converter 118 receives the video content from the content distribution system and generates video content segments 124 for distribution to the client device 120 with the HTTP server 122 via a router 126 that is implemented for wired and/or wireless communication. The client converter 118 can be implemented as an interface for HTTP Live Streaming (HLS) client devices that receive HLS compliant bit streams, as well as other streaming client devices, such as Dynamic Adaptive Streaming over HTTP (DASH) clients.

The example client device 120 may be implemented as any one or combination of a communication, computer, media playback, gaming, entertainment, and/or electronic device, such as a mobile phone or tablet device that can be configured as a television client device to receive and playback media content, such as the video content. The client device 120 can be implemented with various components, such as processor and memory devices, as well as with any combination of differing components as further described with reference to the example electronic device shown in FIG. 8. For example, the client device includes a media rendering system 128 to playback video content for viewing on an integrated display device. The client device can also include various client applications 130, such as a media player 132 that is implemented to manage playback of the video content and other media content at the client device.

An example implementation of the client converter 118 is described with reference to FIG. 2, and the client converter can be implemented with various components, such as a processor and memory devices, as well as with any combination of differing components as further described with reference to the example electronic device shown in FIG. 8. In embodiments, a client converter can be implemented in software and/or hardware as an independent component or device, such as the client converter 118. Alternatively, a client converter may be implemented as an integrated component or device of a content distribution edge server. For example, an edge server that incorporates the client converter can be used to convert multiple IP multicast rate-streams on the WAN side into an HLS or DASH compliant service on the LAN side for WiFi™ devices or other non-QoS managed home sub-networks. Since IP-multicast is a more efficient way to deliver linear, broadcast-style content over the core network and the edge network, it can be leveraged for that purpose and then the IP-multicast converted into HLS compliant signals.

A client converter may also be implemented as an integrated component or device of a client device and/or as a component of the router 126. For example, a client device 134 includes a client converter 136 (e.g., an implementation of the client converter 118) that can be implemented as an after-market software application, which can be downloaded and installed in a client device. The client device 134 can receive video content in a broadcast format from the content distribution system 102, and the client converter 118 is implemented to convert a broadcast content data stream to unicast HTTP data. The client converter can then communicate the video content as the unicast HTTP data to a media player 138 of the client device, such as an HLS player, to playback the video content for viewing.

Figure 2:
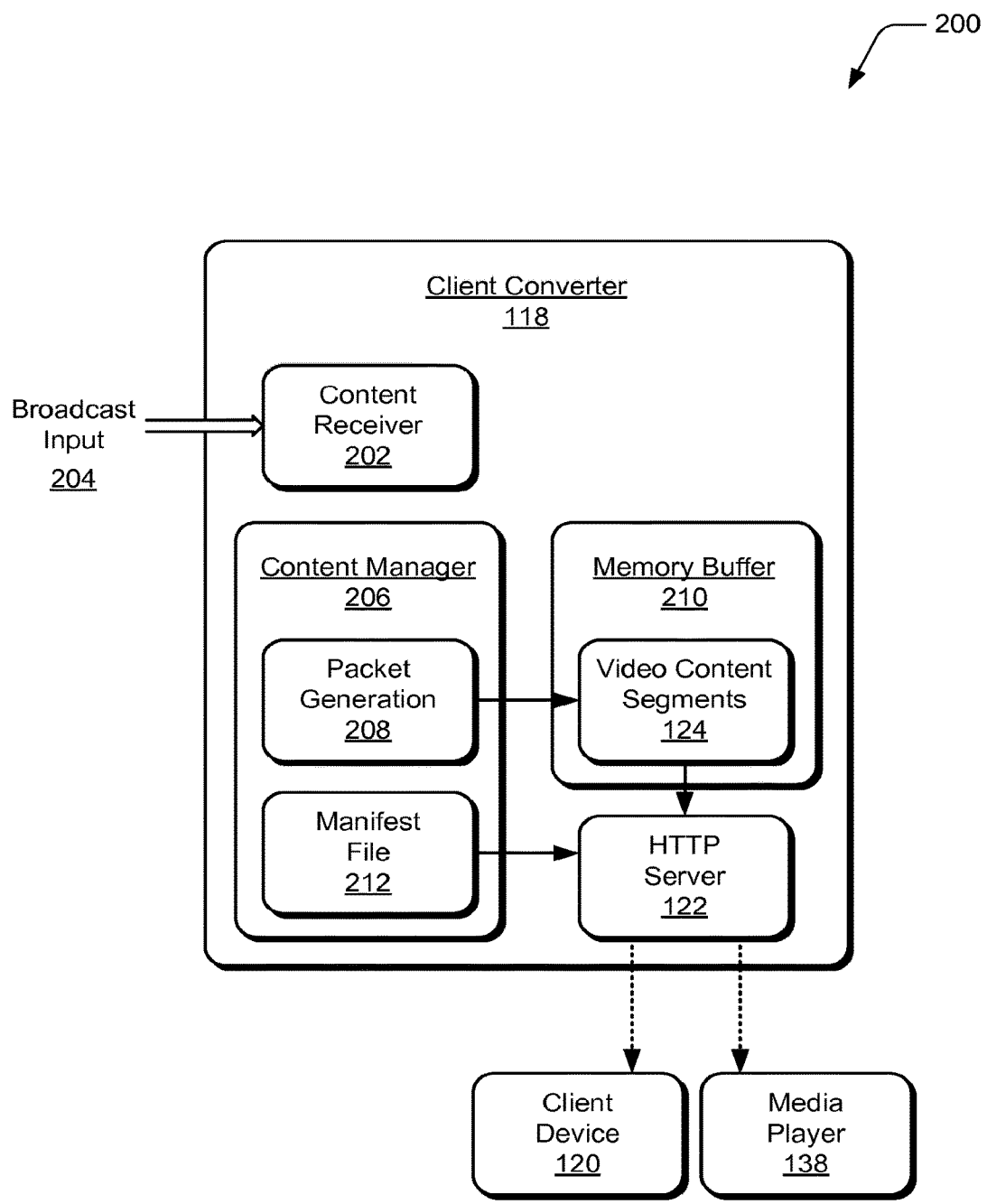
FIG. 2 illustrates an example of implementation of a client converter for broadcast content to HTTP client conversion in accordance with one or more embodiments.

FIG. 2 illustrates an example implementation 200 of the client converter 118 (e.g., an independent component or device) and/or the client converter 136 (e.g., an integrated component of a device or server) as described with reference to FIG. 1, to convert broadcast content data streams to unicast HTTP data. The client converter includes a content receiver 202 that receives a broadcast input 204, such as a broadcast distribution of video content from the content distribution system 102. The client converter 118 monitors broadcast traffic for Internet group management protocols (IGMPs) and communicates like a standard device with the content distribution system. For broadcast content that is sent via IP-multicast, the client converter can discover and join a broadcast program (e.g., content data stream), and publish a list of available programs to client media players. When a user selects a program for playback at a client device, the client converter joins the broadcast content data stream for the program, buffers an amount of data that is sufficient for the client to start playback, packetizes the data as transport stream segments, and publishes the content data as segments that are available for playback via a manifest file, which allows an HLS client to receive and playback the content.

The client converter 118 includes a content manager 206 that can be implemented as computer-executable instructions, such as a software application, and executed by one or more processors to implement embodiments of broadcast content to HTTP client conversion described herein. The content manager 206 implements packet generation 208, which can include a packet parser and packet grouping components to generate the video content segments 124. The client converter also includes a memory buffer 210 that is implemented to buffer the video content segments for distribution via the HTTP server 122.

In implementations, the memory buffer 210 is implemented to buffer approximately thirty-seconds of HTTP segments (e.g., three segments at ten-seconds each), a user-configurable duration of the segments, or any implementation specific duration of the segments. A video segment is multiple frames of the video content. For example, a one-second video segment may include thirty frames, and a client device may be designed to wait for ten-seconds of the buffered video segments before the video content is played back at the client device. For HTTP Live Streaming, a common implementation is ten-second segments with approximately ten of the buffered video segments listed in the content manifest file. This content buffering latency varies with different devices and manufacturers. For example, some client devices may be implemented for three segments of stored video, with some client devices having segments that are only one-second in duration and other client devices having segments that are two-seconds in duration.

The buffered video content segments 124 also facilitate content navigation commands (also referred to as 'trick modes'), such as to pause, rewind, fast-forward to the most current video segment, and other video content navigation. When the client converter 118 receives content navigation commands from a media player via HTTP, the client converter can publish an updated manifest file 212 to the media player with updated lists of segment files. Alternatively, the manifest file itself can be maintained as the video content segments having a total duration equal to an allowable duration or length of content navigation commands. For example, the system may allow a user to seek back one-minute, and for ten-second segments, the manifest file 212 would be nine segments.

The content manager 206 also generates a manifest file 212 that correlates to the video content segments, and the manifest file is published to the client devices. The client converter 118 generates the HTTP segments and implements the HTTP server 122 for the client devices to request and receive the content via unicast. As described with reference to FIG. 1, the HTTP server 122 communicates the video content segments 124 to the client device 120 (via the router 126) and/or communicates the video content segments to the media player 138 at the client device 134 when the client converter is implemented as a component or device of the client device.

In implementations, the client converter 118 converts the video content from the broadcast input 204 to the video content segments 124 (e.g., the HLS or DASH segments) for a client device media player. The broadcast content streams of a program are synchronized and have random access points (RAPs) at the same frame in each of the broadcast content streams. In an alternate embodiment, the video content segments 124 may be generated at the content distribution system 102 and then the video content segments communicated to the client converter. The sequence of segments that are a single version of a program at a particular bitrate can be broadcast on the same IP address. In this embodiment, the client converter 118 stores the video content segments directly (e.g., skipping the packet generation).

Figure 3:
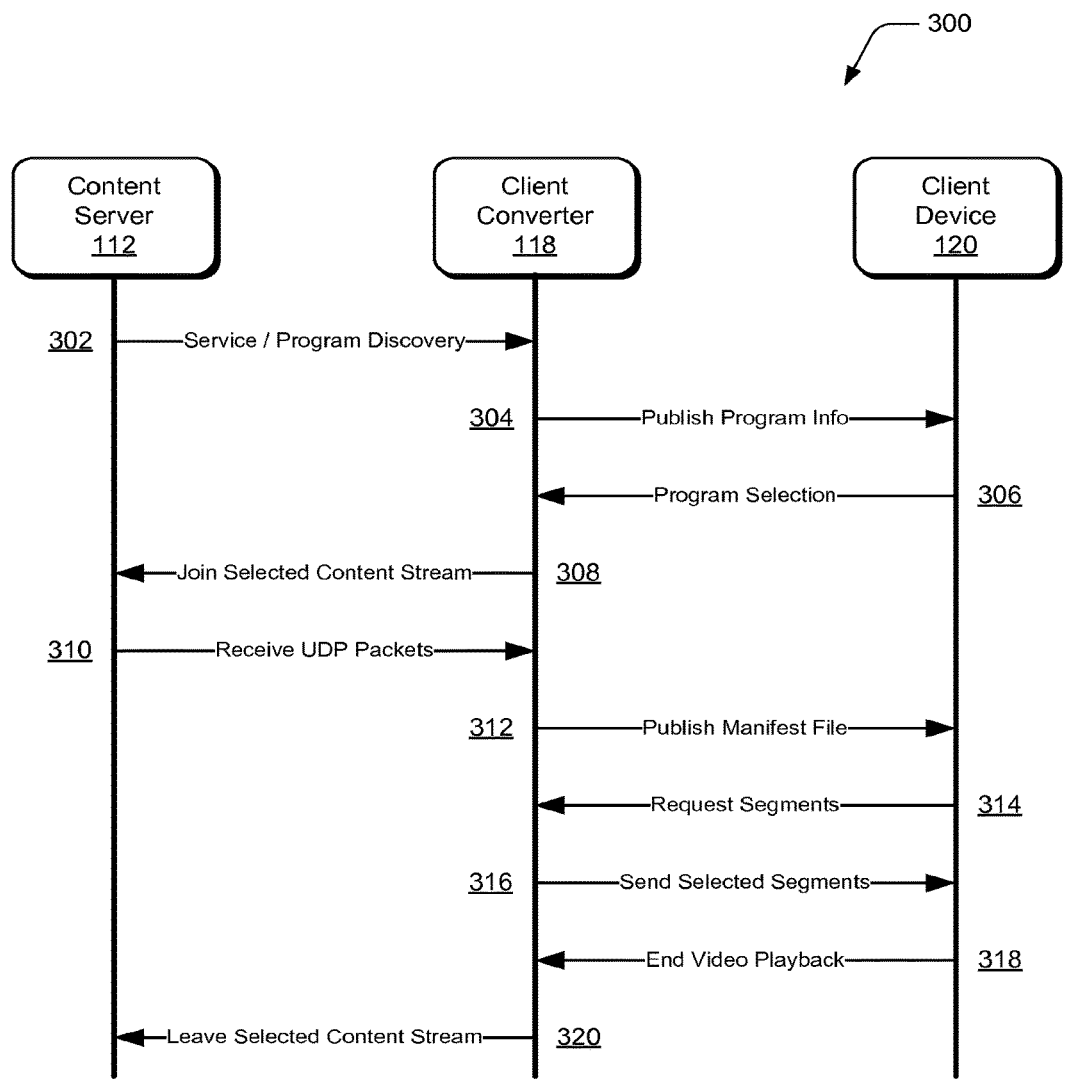
FIG. 3 illustrates an example data communication sequence diagram for broadcast content to HTTP client conversion in accordance with one or more embodiments.

FIG. 3 illustrates an example of a data communication sequence 300 between a content server 112, the client converter 118, and a client device 120. The content server and the client device are described with reference to FIG. 1, and the client converter is described with reference to FIGS. 1 and 2. In the example communication sequence 300, the content server 112 communicates service and/or program discovery 302 to the client converter 118, which then publishes the program information 304 to the client device. The client converter can discover all available broadcast programs using service discovery protocols, such as session announcement protocol (SAP) and simple service discovery protocol (SSDP), and publishes the programs to client devices via an application program interface (API) or via a Web page.

The client device 120 communicates a program selection 306 back to the client converter 118, which then joins the selected broadcast content stream at 308. When a user at the client device chooses one of the published programs, the client converter communicates an Internet group management protocol (IGMP) Join message for the selected broadcast program. The content server 112 then communicates the user datagram protocol (UDP) packets 310 to the client converter for the selected broadcast content stream for the selected program. The packets can include encapsulated MPEG transport stream (TS) packets.

To determine segment boundaries, the client converter 118 can parse a TS PES (packetized elementary stream) header to determine the presentation timestamps of each TS packet, and then group the TS packets into segments with a predefined duration (e.g., determined as the Last packet PTS–the First TS packet PTS=Predefined Duration) and store the segments in the memory buffer. Each segment will contain at least one instantaneous decoding refresh (IDR) picture. Alternatively, segment hints (at IDR boundaries and a segment worth of TS packets) as part of the UDP packets can be provided instead of determining the segment boundaries at the client converter.

The information associated with the segment boundaries or random access points (RAP) can be used as navigational information to switch from one bitrate on one content stream to another bitrate on a separate content stream. Additionally, navigation tables can be sent as a separate content stream, published via HTTP, and the client converter 118 can pull them or embed them in the transport stream itself. An embedded navigation table points to one key-stream as the entry point stream for all of the client devices, and this entry point key-stream holds the entries to the navigation tables to get to the other streams in the suite of multi-bitrate streams.

The client converter 118 can publish the manifest file at 312 to the client device 120, which then requests the video content segments at 314. The client converter publishes the manifest file and allows the media player of the client device to download the manifest file. The media player receives the manifest file, and can then send HTTP requests to the client converter for video content segments that are listed in the manifest file. The client converter 118 then sends the selected video content segments to the client device at 316 for playback at the client device (e.g., the client converter receives the HTTP request, and sends back the requested segment file via HTTP). Subsequently, the client device 120 can communicate an end video playback message 318 to the client converter 118, which then leaves the content stream at 320. Alternatively, the program can be completed and a notification sent to the client converter using, for example, an SAP protocol message. The client converter can insert a #EXT-X-ENDLIST tag in the manifest file to indicate to the client device that the program has completed. When the user finishes viewing a program at the client device 120, the client converter can send an IGMP Leave message to the content server.

Figure 4:
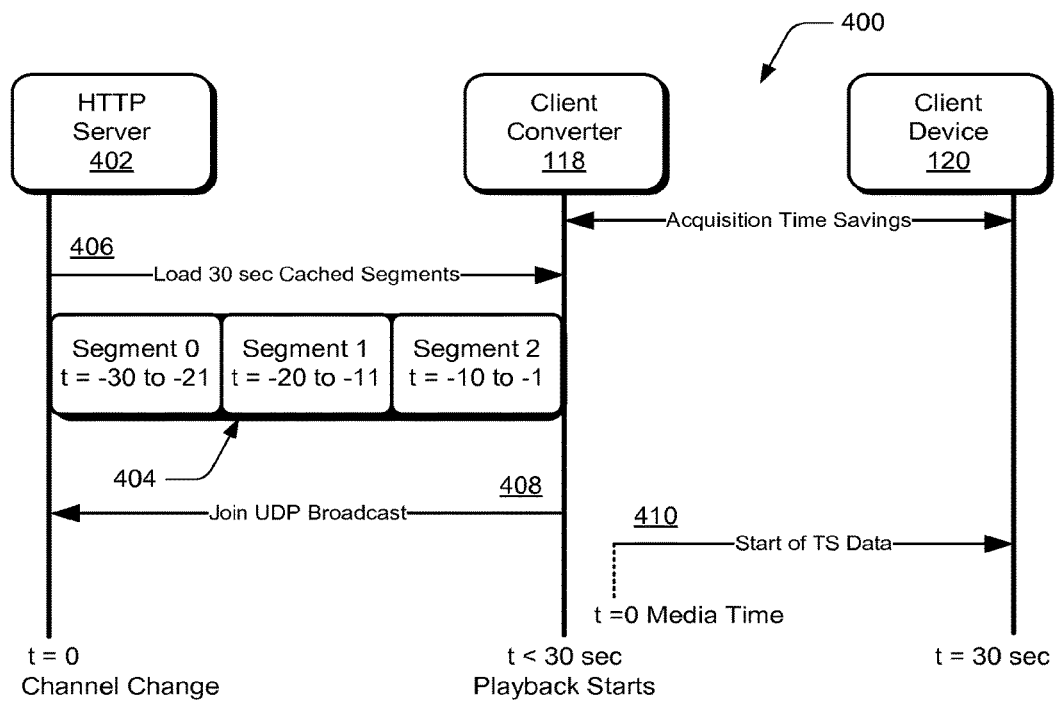
FIG. 4 illustrates an example client converter stream acquisition technique for broadcast content to HTTP client conversion in accordance with one or more embodiments.

FIG. 4 illustrates an example 400 of client converter stream acquisition for broadcast content to HTTP client conversion. In this example, an optimization technique is implemented to speed up stream acquisition time at the client converter 118. Television viewers typically have an expectation of instant channel changes, and are not accustomed to the delays that are inherent with television or other video content viewing on mobile client devices. An HTTP stream player (e.g., the media player 132 at the client device 120) may have buffering delays built-in that improve playback performance, but at the cost of longer stream acquisition time. For example, if an HTTP stream consists of three ten-second segments in the manifest file 212, then until thirty-seconds of video is buffered and available, the media player will not playback the video for display. For unicast HTTP streams that are published by a server, this can be alleviated by always having at least three or more segments available for download. However, for broadcast content to HTTP unicast, the video content is received at the client converter via UDP at the compressed media bitrate, and the client converter needs to buffer enough data (e.g., thirty-seconds in this example) before the media player can start playback of the video content.

To reduce and/or avoid the acquisition time delay, such as for a channel change, an HTTP server 402 (e.g., at the content distribution system 102, or elsewhere in the network) can publish the past thirty-seconds (or more) of data as the cached segments 404 that are downloaded at 406 a faster rate to the client converter 118, depending on the network bandwidth. The client converter downloads an initial duration of the video content (e.g., the past thirty-seconds of the video content) and the HTTP server 122 of the client converter communicates the initial duration of the video content to the client device. At approximately the same time duration, the client converter can buffer the broadcast content stream at 408 and generate the video content segments 124. After the initial three or more cached segments 404 are downloaded by unicast HTTP to the client converter, the client converter can then continue to download the rest of the video content segments utilizing the broadcast content stream. With this stream acquisition technique to reduce the acquisition time delay for a channel change, the media player 132 at the client device 120 receives the cached segments 404 for video playback right away via HTTP (allowing better acquisition time), and then switches to the broadcast content stream at 410 after the initial buffer playback is complete (allowing better network utilization) by stitching the media streams from the two sources.

Alternate optimization techniques may also be implemented. For example, the client converter 118 can maintain the last thirty-seconds (or more) of current video from all of the available broadcast sources in an internal cache. When a channel change is requested, the client converter can then send the cached segments to the client player first while it is connecting to the broadcast source. In another example optimization, a content server 112 (from which the past segments are downloaded) buffers the previous thirty-seconds (or more) and broadcasts this content in a separate channel at a faster rate, such as at 2× or 4× and in a segmented carousel (e.g., the last thirty-seconds of a multicast is sent four times over the next thirty-seconds in the carousel). A channel change then causes the client converter to first join the fast broadcast channel, get the last thirty-seconds in approximately seven and one-half (7.5) seconds, and segment from there. This technique can be implemented so that the client converter does not have to then join all of the multicasts for all programs and maintain thirty-second caches internally for all of the programs, as described above. In a variation of this example optimization, a lower bitrate version for a group of channels of programming is multiplexed and communicated on the broadcast channel. Since the video content is at a lower bitrate, more channels can be packed without having the channel being broadcasted at the faster 2× or 4× rate.

Figure 5:
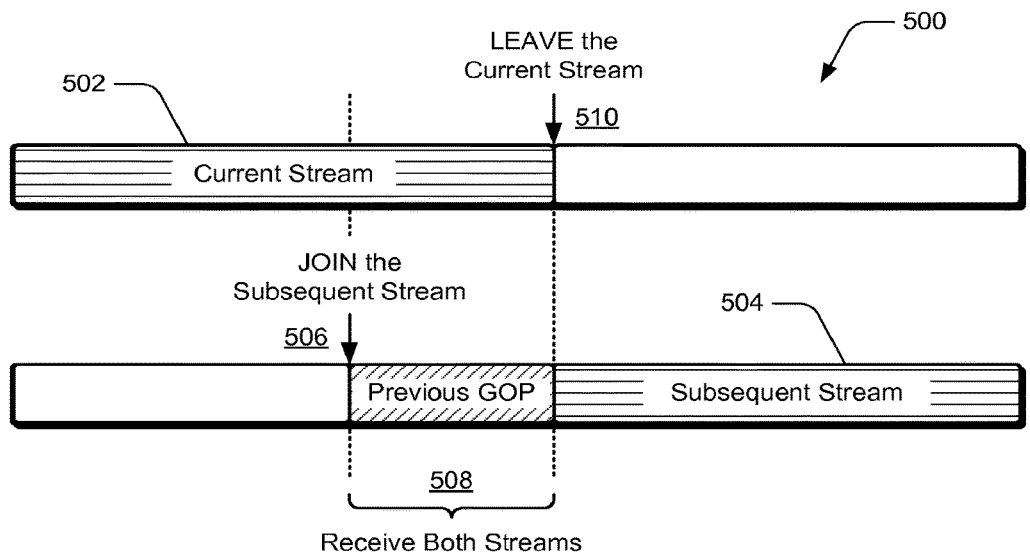
FIG. 5 illustrates an example client converter join-before-leave technique for broadcast content to HTTP client conversion in accordance with one or more embodiments.

FIG. 5 illustrates an example 500 of a client converter technique to join-before-leave for broadcast content to HTTP client conversion. When a channel change is initiated at the client device 120 to change from one program to another (e.g., change from one video content stream to another), the client converter 118 sends an IGMP Join message to join a subsequent (e.g., next) stream before sending an IGMP Leave message to leave the current stream. For example, the client converter 118 receives the current stream 502 from which the video content segments 124 are generated, buffered, and then communicated to the client device 120 for playback by the media player 132. When a channel change is initiated at the client device, the client converter 118 joins the subsequent stream 504 at a time 506, and continues to convert and/or buffer the current stream 502 until the next random access point (RAP) is determined. The broadcast content streams are generated and transmitted so that the RAPs line up between the streams. Both the current stream 502 and the subsequent stream 504 are received for a duration 508 until the RAP is determined, and then the client converter 118 leaves the current stream at the time 510 and continues receiving the subsequent stream. In this example, the current stream 502 becomes the previous stream, and the subsequent stream 504 becomes the current stream at the client converter.

Example methods 600 and 700 are described with reference to respective FIGS. 6 and 7 in accordance with one or more embodiments of broadcast content to HTTP client conversion. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 6:
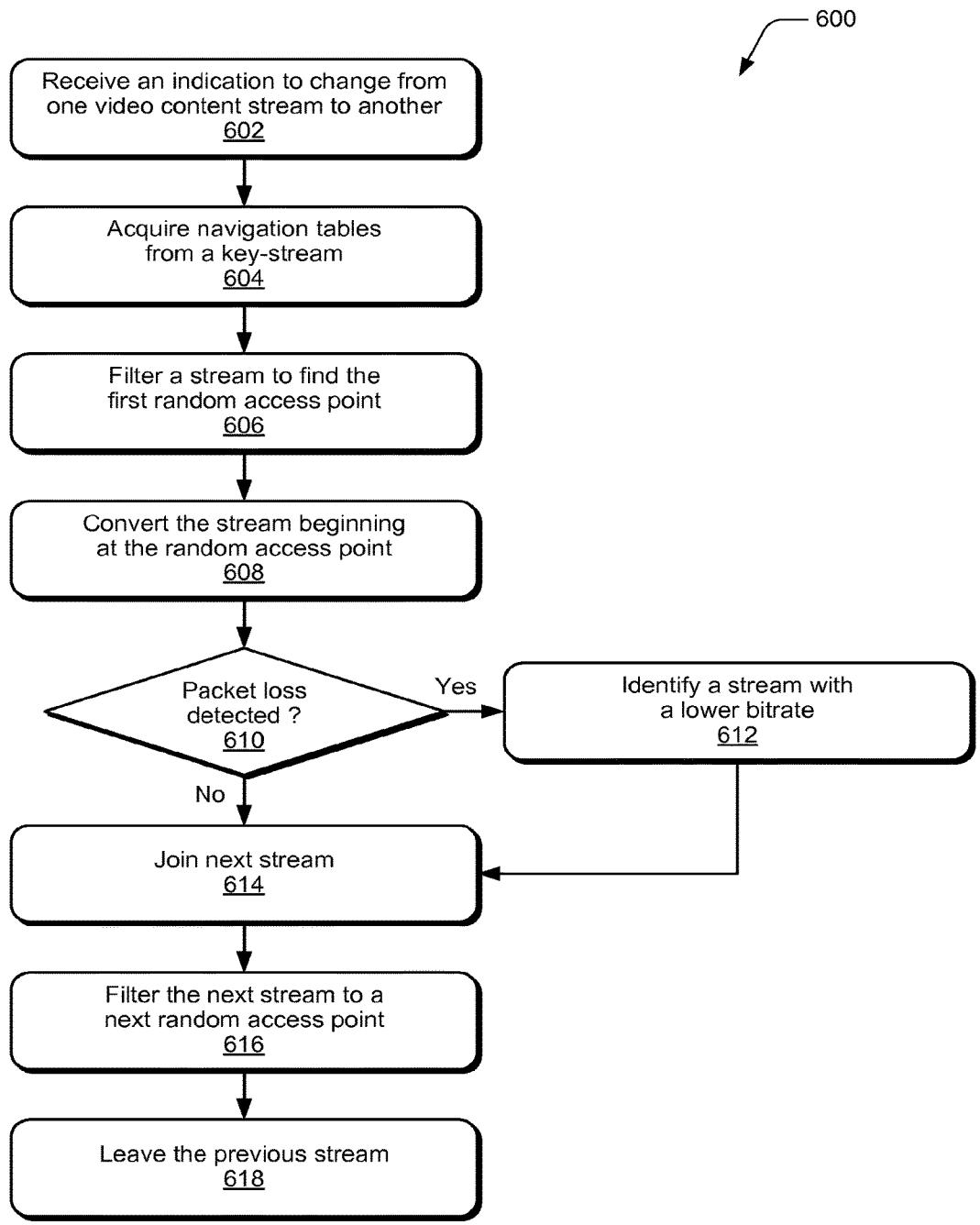
FIG. 6 illustrates an example method of the join-before-leave technique for broadcast content to HTTP client conversion in accordance with one or more embodiments.

FIG. 6 illustrates an example method 600 of the join-before-leave technique for broadcast content to HTTP client conversion. The order in which the method blocks are described are not intended to be construed as a limitation, and any number or combination of the described method blocks can be combined in any order to implement a method, or an alternate method.

At block 602, an indication to change from one video content stream to another is received. For example, the client converter 118 may receive a channel change command that is initiated at the client device 120 to change from one program to another. Alternatively, the client converter may receive an indication to change from a higher bitrate stream to a lower bitrate stream, or vice-versa.

At block 604, navigation tables are acquired from a key-stream. For example, the client converter 118 acquires navigation tables that are embedded in a key-stream, which is an entry point stream for the client device 120. The navigation tables can be sent as a separate content stream, published via HTTP, and the client converter 118 can pull them or embed them in the transport stream itself. An embedded navigation table points to one key-stream as the entry point stream for all of the client devices, and this entry point stream holds the entries to the navigation tables to get to the other streams in the suite of multi-bitrate streams.

At block 606, a stream is filtered to find the first random access point (RAP) and, at block 608, the stream is converted at the first RAP. For example, the client converter 118 filters a stream to find the first random access point and begins converting and/or buffering the stream from the first RAP.

At block 610, a determination is made as to whether packet loss is detected. For example, the client converter 118 determines whether packets are being lost from the stream, which indicates a need to select a lower bitrate stream. If packet loss is detected (i.e., "yes" from block 610), then at block 612, a stream with a lower bitrate is identified. For example, the client converter 118 uses the navigation tables to identify a lower bitrate stream. The information associated with the segment boundaries or random access points (RAP) can be used as navigational information to switch from one bitrate on one broadcast content stream to another bitrate on a separate broadcast content stream. Alternatively or in addition, the client converter can publish all of the different bitrates as part of a multi-rate and/or resolution manifest file allowing the client to monitor packet loss and select the best bitrate and/or resolution based on current CPU loading, network bandwidth, etc. When the client selects a bitrate in the multi-rate and/or resolution manifest file, the client converter will join the new bitrate and/or resolution and, once it has enough data buffered, will then leave the multicast for the previous bitrate. To speed up acquisition for a bitrate change, the client converter can use the HTTP server approach described with reference to FIG. 4 to receive the last set of segments by HTTP.

If packet loss is not detected (i.e., "no" from block 610), or continuing from block 612, the next stream is joined at block 614 and, at block 616, the next stream is filtered to a next random access point. For example, the client converter 118 joins the subsequent stream 504 (e.g., the next stream or the lower bitrate stream) at a time 506, and continues converting and/or buffering the current stream 502 until the next random access point (RAP) is determined in the subsequent stream.

At block 618, the previous stream is left. For example, both the current stream 502 and the subsequent stream 504 are received for a duration 508 until the RAP is determined, and then the client converter 118 leaves the current stream at the time 510 and continues receiving the subsequent stream.

Figure 7:
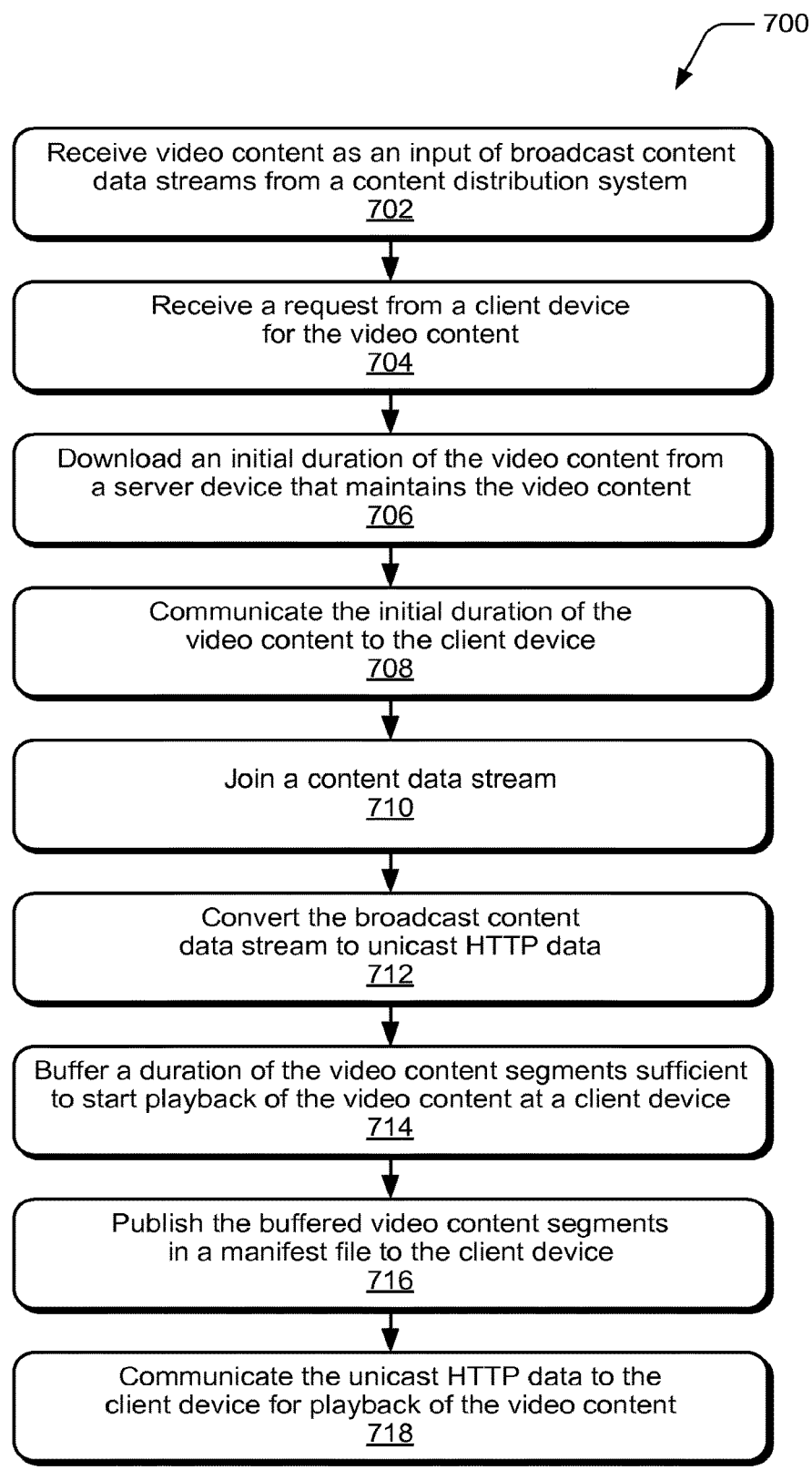
FIG. 7 illustrates example method(s) for broadcast content to HTTP client conversion in accordance with one or more embodiments.

FIG. 7 illustrates example method(s) 700 of broadcast content to HTTP client conversion. The order in which the method blocks are described are not intended to be construed as a limitation, and any number or combination of the described method blocks can be combined in any order to implement a method, or an alternate method.

At block 702, video content is received as an input of broadcast content data streams from a content distribution system. For example, the client converter 118 includes the content receiver 202 (FIG. 2) that receives the input 204 of broadcast content data streams from the content distribution system 102. At block 704, a request is received from a client device for the video content. For example, the client converter 118 receives a request from the client device 120 for video content, such as a published program.

At block 706, an initial duration of the video content is downloaded from a server device that maintains the video content. For example, the client converter 118 implements the optimization technique described with reference to FIG. 4, and downloads the past thirty seconds (or other duration) of the video content as the cached segments 404 from the HTTP server 402. At block 708, the initial duration of the video content is communicated to the client device. For example, the HTTP server 122 of the client converter 118 communicates the initial duration of the video content to the client device 120 for playback of the video content while the client converter buffers the broadcast content stream and generates the video content segments 124.

At block 710, a content data stream is joined. For example, the content manager 206 at the client converter 118 joins a content data stream of the broadcast input 204. As described with reference to FIGS. 5 and 6, the content manager 206 of the client converter joins the next content data stream 504 (e.g., the subsequent stream) and determines a random access point in the data stream from which to begin converting the data stream. The client converter also continues converting the previous content data stream 502 (e.g., the current stream) while determining the random access point in the next content data stream (e.g., both streams are received for the duration 508). The client converter then leaves the previous content data stream after the random access point is determined and the subsequent content data stream begins converting.

At block 712, the broadcast content data stream is converted to unicast HTTP data. For example, the content manager 206 at the client converter 118 converts the broadcast content data stream to the unicast HTTP data, such as by generating the video content segments 124. The content manager 206 implements packet generation 208, which can include a packet parser and packet grouping components to packetize the video content segments for transport.

At block 714, a duration of the video content segments sufficient to start playback of the video content at a client device is buffered. For example, the memory buffer 210 of the client converter 118 buffers a duration of the video content segments 124, such as thirty-seconds or other sufficient duration, to start playback of the video content at the client device 120. At block 716, the buffered video content segments are published in a manifest file to the client device. For example, the content manager 206 at the client converter 118 generates the manifest file 212 and publishes the buffered video content segments to the client device 120.

At block 718, the unicast HTTP data is communicated to the client device for playback of the video content. For example, the HTTP server 122 of the client converter 118 communicates the unicast HTTP data (e.g., the buffered video content segments 124) that are generated from the broadcast content data stream to the client device 120, such as when the client converter is implemented as an independent device. Alternatively, the client converter 136 is implemented as a component of the client device 134, and includes an HTTP server that communicates the unicast HTTP data to the media player 138 of the client device.

Figure 8:
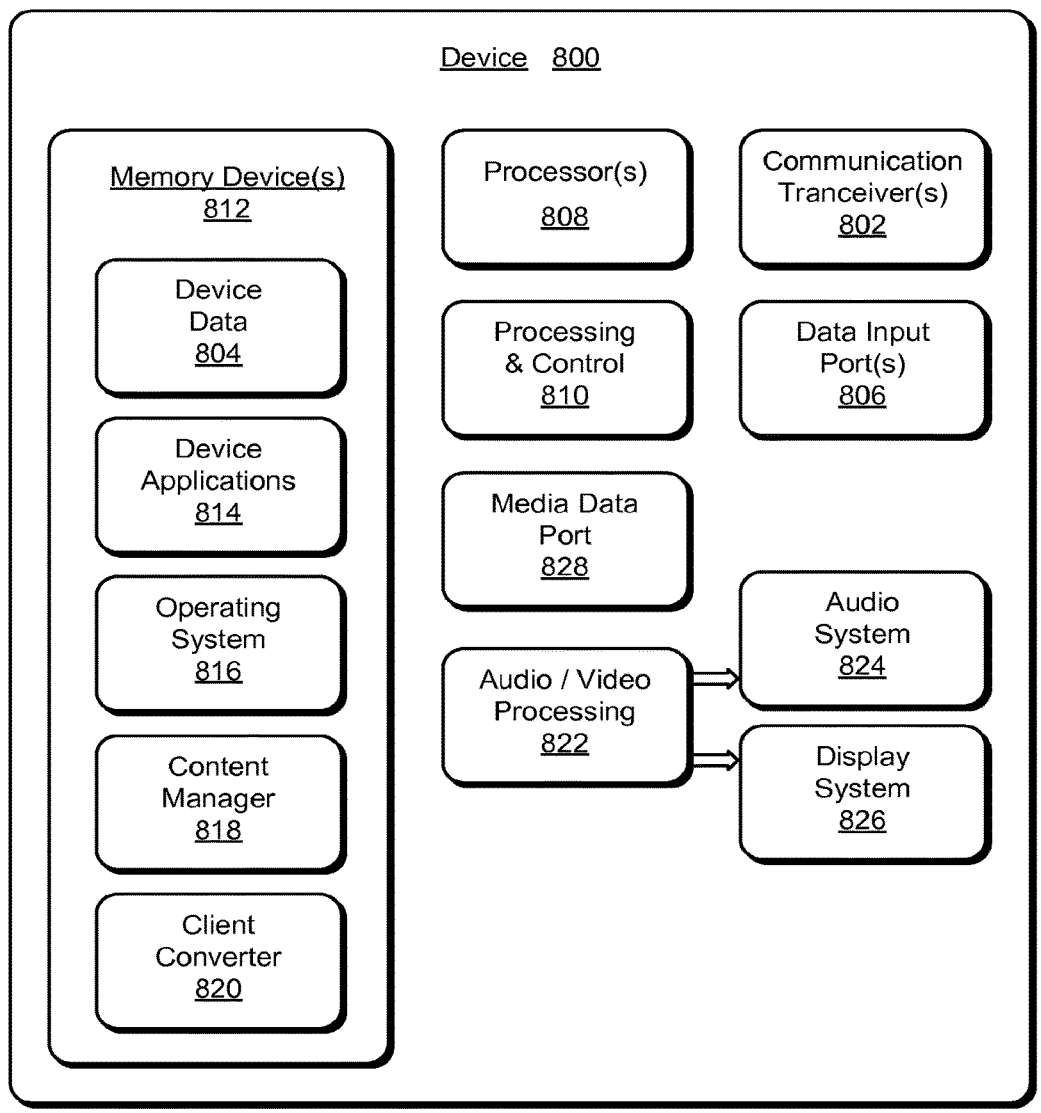
FIG. 8 illustrates various components of an example electronic device that can implement embodiments of broadcast content to HTTP client conversion.

FIG. 8 illustrates various components of an example electronic device 800 that can be implemented as any device described with reference to any of the previous FIGS. 1-7. In embodiments, the electronic device may be implemented as a client converter 118 and/or 136, as a client device 120 and/or 134, or as the content distribution system 102, such as described with reference to FIG. 1. Alternatively or in addition, the electronic device may be implemented in any form of device that can receive and playback streaming video content, such as any one or combination of a communication, computer, media playback, gaming, entertainment, mobile phone, and/or tablet computing device.

The electronic device 800 includes communication transceivers 802 that enable wired and/or wireless communication of device data 804, such as received data, data that is being received, data scheduled for broadcast, data packets of the data, etc. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular telephony, wireless metropolitan area network (WMAN) radios compliant with various IEEE 802.15 (WiMAX™) standards, and wired local area network (LAN) Ethernet transceivers.

The electronic device 800 may also include one or more data input ports 806 via which any type of data, media content, and/or inputs can be received, such as user-selectable inputs, messages, music, television content, recorded video content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the electronic device to components, peripherals, or accessories such as microphones or cameras.

The electronic device 800 includes one or more processors 808 (e.g., any of microprocessors, controllers, and the like), or a processor and memory system (e.g., implemented in an SoC), which process computer-executable instructions to control operation of the device. Alternatively or in addition, the electronic device can be implemented with any one or combination of software, hardware, firmware, or fixed logic circuitry that is implemented in connection with processing and control circuits, which are generally identified at 810. Although not shown, the electronic device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 800 also includes one or more memory devices 812 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The electronic device 800 may also include a mass storage media device.

A memory device 812 provides data storage mechanisms to store the device data 804, other types of information and/or data, and various device applications 814 (e.g., software applications). For example, an operating system 816 can be maintained as software instructions within a memory device and executed on the processors 808. The device applications may also include a device manager, such as any form of a control application, software application, signal-processing and control module, code that is native to a particular device, a hardware abstraction layer for a particular device, and so on. The electronic device may also include a content manager 818 and/or a client converter 820 (e.g., a software application) to implement embodiments of broadcast content to HTTP client conversion.

The electronic device 800 also includes an audio and/or video processing system 822 that generates audio data for an audio system 824 and/or generates display data for a display system 826. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 828. In implementations, the audio system and/or the display system are external components to the electronic device. Alternatively, the audio system and/or the display system are integrated components of the example electronic device.

Although embodiments of broadcast content to HTTP client conversion have been described in language specific to features and/or methods, the subject of the appended claims is not necessarily limited to the specific features or methods described. Rather, the specific features and methods are disclosed as example implementations of broadcast content to HTTP client conversion.

What is claimed is:

1. A method comprising:
receiving a request from a client device for a first content data stream of a plurality of broadcast content data streams, wherein the request comprises a request to change from a second content data stream to the first content data stream;
joining, by a processor in the client device, the first content data stream in response to receiving the request;
initiating a determination of an access point in the first content data stream from which to begin converting the first content data stream to unicast HTTP data;
receiving, during the determination of the access point, the first content data stream and the second content data stream of the plurality of broadcast content data streams, wherein at least a portion of the second content data stream is received concurrently with the first content data stream and a portion of the second content stream is received before the request for the first content stream; and
converting, by the processor in the client device, the first content data stream to unicast HTTP data from the determined access point.

2. The method of claim 1, further comprising communicating the unicast HTTP data to the client device for playback of the video content.

3. The method of claim 2, further comprising communicating an initial duration of the video content to the client device prior to communicating the unicast HTTP data to the client device.

4. The method of claim 1, wherein converting the first content data stream further comprises:
generating a plurality of video segments based on the first content data stream; and
publishing the video segments in a manifest file.

5. The method of claim 1, further comprising:
converting the second content data stream during the determination of the access point in the first content data stream; and
leaving, by the processor, the second content data stream after the access point is determined.

6. The method of claim 1, wherein the access point is a random access point.

7. The method of claim 1, wherein the request to change from the second content data stream to the first content data stream comprises a request to change from one channel to another channel.

8. The method of claim 1, wherein the request to change from the second content data stream to the first content data stream comprises a request to change from one program to another program.

9. The method of claim 1, wherein the request to change from the second content data stream to the first content data stream comprises a request to change from one bitrate stream to another bitrate stream.

10. A client device comprising:
a memory; and
a processor communicably coupled to the memory, the processor to:
receive a request from a media player of the client device for a first content data stream of a plurality of broadcast content data streams, wherein the request comprises a request to change from a second content data stream to the first content data stream;
join the first content data stream in response to receiving the request;
initiate a determination of an access point in the first content data stream from which to begin converting the first content data stream to unicast HTTP data;
receive, during the determination of the access point, the first content data stream and the second content data stream of the plurality of broadcast content data streams, wherein at least a portion of the second content data stream is received concurrently with the first content data stream and a portion of the second content stream is received before the request for the first content stream; and
convert the first content data stream to unicast HTTP data from the determined access point.

11. The client device of claim 10, wherein the processor is further to communicate the unicast HTTP data to the media player for playback of the video content.

12. The client device of claim 11, wherein the processor is further to communicate an initial duration of the video content to the media player prior to communicating the unicast HTTP data to the media player.

13. The client device of claim 10, wherein to convert the first content data stream, the processor is further to:
generate a plurality of video segments based on the first content data stream; and
publish the video segments in a manifest file.

14. The client device of claim 10, wherein the processor is further to:
convert the second content data stream during the determination of the access point in the first content data stream; and
leave the second content data stream after the access point is determined.

15. The client device of claim 10, wherein the access point is a random access point.

16. A non-transitory computer-readable storage medium storing instructions which, when executed, cause a processor in a client device to:
receive a request from a media player of the client device for a first content data stream of a plurality of broadcast content data streams, wherein the request comprises a request to change from a second content data stream to the first content data stream;
join, by the processor, the first content data stream in response to receiving the request;
initiate a determination of an access point in the first content data stream from which to begin converting the first content data stream to unicast HTTP data;
receive, during the determination of the access point, the first content data stream and the second content data stream of the plurality of broadcast content data streams, wherein at least a portion of the second content data stream is received concurrently with the first content data stream and a portion of the second content stream is received before the request for the first content stream; and
convert the first content data stream to unicast HTTP data from the determined access point.

17. The non-transitory computer-readable storage medium of claim 16, wherein the processor is further to communicate the unicast HTTP data to the media player for playback of the video content.

18. The non-transitory computer-readable storage medium of claim 17, wherein the processor is further to communicate an initial duration of the video content to the media player prior to communicating the unicast HTTP data to the client device.

19. The non-transitory computer-readable storage medium of claim 16, wherein the processor is further to:
convert the second content data stream during the determination of the access point in the first content data stream; and
leave the second content data stream after the access point is determined.

20. The non-transitory computer-readable storage medium of claim 16, wherein the access point is a random access point.

* * * * *